C. A. JOHNSTON.
PIPE TONGS.
APPLICATION FILED SEPT. 14, 1921.
1,433,623.
Patented Oct. 31, 1922.
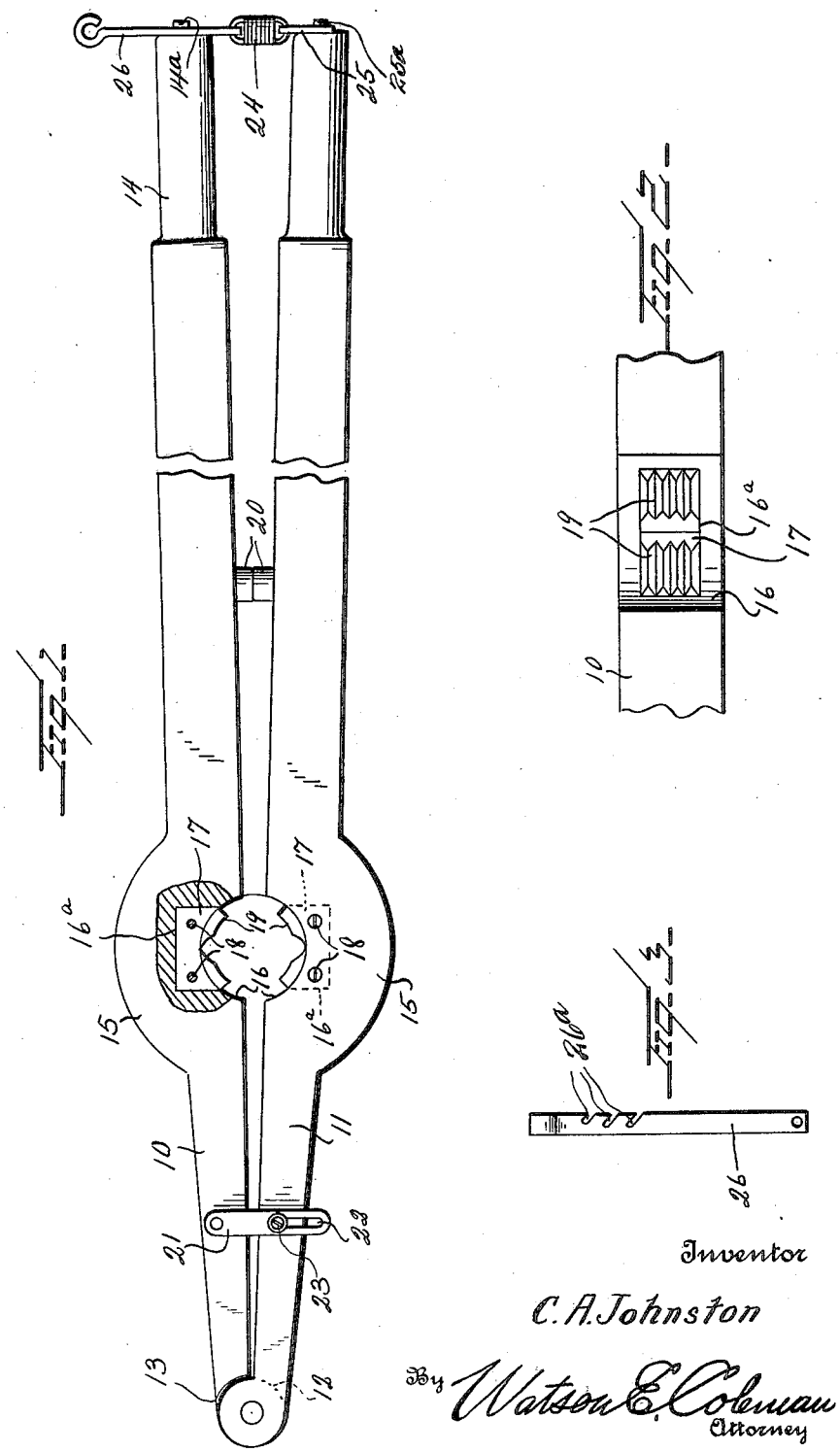

Patented Oct. 31, 1922.

1,433,623

UNITED STATES PATENT OFFICE.

CARLTON A. JOHNSTON, OF NEW ROCKFORD, NORTH DAKOTA.

PIPE TONGS.

Application filed September 14, 1921. Serial No. 500,591.

*To all whom it may concern:*

Be it known that I, CARLTON A. JOHNSTON, a citizen of the United States, residing at New Rockford, in the county of Eddy and State of North Dakota, have invented certain new and useful Improvements in Pipe Tongs, of which the following is a specification, reference being had to the accompanying drawings.

This invention relates to pipe tongs such as are used in raising and lowering strings of pipe in drilled wells and in screwing and unscrewing sections of pipe, and the general object of my invention is to provide a particularly simple and effective pipe tongs of this character so constructed that it will hold the pipe very strongly and firmly and that it may be readily adapted to different sizes of pipe within reasonable limits.

Other objects will appear in the course of the following description.

My invention is illustrated in the accompanying drawings, wherein:—

Figure 1 is a top plan view of a pipe wrench constructed in accordance with my invention, one edge being partly broken away;

Figure 2 is a fragmentary inside elevation of one of the elements of the pipe wrench;

Figure 3 is an elevation of the link 26;

Referring to these drawings, it will be seen that my pipe tongs comprises the two members 10 and 11. These members are pivoted to each other at one end, one of the members being bifurcated, as at 12, for this purpose and the other member being formed with a nut 13 extending through the bifurcation, through which a pivot pin passes. The opposite ends of the members 10 and 11 are formed with handles 14. The middle portion of each member 10 and 11 is enlarged, as at 15, and the inner face of this enlargement is semi-circularly recessed, as at 16. The semi-circular face of this recess is also recessed, as at 16ª. Disposed within this rectangular recess 16ª is a toothed gripping jaw 17 formed of hardened steel held in place by means of screws 18, each gripping jaw having a V-shaped recess on its inner face, the two walls of the V-shaped recess being toothed, as at 19, see Figure 2, so that the toothed faces will engage and bite into the pipe when the levers or members 10 and 11 are brought together.

Preferably the shanks or handle portions of these members 10 and 11 will be formed with stop lugs 20 which abut against each other when the members 10 and 11 are brought together, limiting the inward movement of the members 10 and 11, and preferably there will be pivoted to the member 10 a link 21, the opposite end of which is longitudinally slotted, as at 22, and a pin 23 will extend from the member 11 through the slot 22, this link acting to limit the outward movement of the members 10 and 11 with relation to each other. The members 10 and 11 are drawn together by means of a strong coiled contractile spring 24 having link 25, one of which is attached to the extremity of one of the handles 14, the other link 26 being relatively long and attached to the other extremity of the handle 14.

It will be seen that with this device great force may be exerted upon the pipe engaged by the teeth 19 and thus the pipe may be held from rotation or supported from downward movement and that the spring 24 will act to hold the levers or members 10 and 11 with the teeth 19 of the jaws in such engagement with the pipe as to prevent the pipe tongs from slipping upon the pipe.

The tongs may be used with any pipe and the jaws held closed by means of the spring lock consisting of the parts 24, 25 and 26, without the use of set screws, or lug tighteners, and may be used by one person alone. The tongs may be used by placing two planks (not shown) across the top of a well curb two or three inches from the pipe on each side thereof, upon which the tongs may be placed, thereby giving the tongs a solid foundation. The tongs are then placed on the pipe and locked by the parts 24, 25 and 26, thus holding the pipe firmly, so that it cannot slip. Then another length of pipe may be screwed on the first section of pipe, thus held, and the pipe may then be lowered or raised as desired.

The spring 24 is fastened to a link 25 which is attached to one end of the hand grip of one of the jaws by a set screw 25ª. The link 26 is provided with a series of notches 26ª, so that the operator may slip any one of the notches 26ª over set screw 14ª on the end of the other hand grip, and securely lock the tongs and then a single operator may readily handle the tongs. The purpose of the link 21 is to prevent the jaws 10 and 11 from spreading too far, and to hold the jaws in place and prevent twisting or breaking of the joint at 13.

I claim:—

1. A pipe tongs of the character described comprising oppositely disposed, confronting members operatively pivoted to each other at one end and provided with handles at the other end, confronting jaws on said members, a contractile spring operatively attached to one of said handles, and a link having a plurality of notches engaged with said spring and adapted to be operatively engaged with the other handle whereby to resiliently limit the movement of the members away from each other and urge the members toward each other.

2. A pipe tongs of the character described comprising oppositely disposed, confronting members operatively pivoted to each other at one end and provided with handles at the other end, confronting jaws mounted upon said members, and means for limiting the movement of the members toward each other and the movement of the members away from each other.

3. A pipe tongs of the character described comprising oppositely disposed, confronting members operatively pivoted to each other at one end and provided with handles at the other end, confronting jaws mounted upon said members, means for limiting the movement of the members toward each other and the movement of the members away from each other, and means at the extremities of the members whereby the members are urged toward each other.

4. A pipe tongs of the character described comprising two members pivoted to each other at one end, the opposite end being provided with handles, each of said members intermediate its length being enlarged and the confronting edge faces of said members at this enlargement being concave, there being rectangular recesses formed in said concave faces, rectangular jaws removably disposed in said recesses, means holding the jaws in place within said recesses, means limiting the outward and inward movement of the members, and means urging the members toward each other.

In testimony whereof I hereunto affix my signature.

CARLTON A. JOHNSTON.